3,521,051
INSTALLATION DEVICE, ESPECIALLY FOR MOUNTING RISING OR ASCENDING CONDUITS OR THE LIKE
Eugen Wullschleger, Bleichemattestrasse 15, Aarau, Switzerland, and Hans Tanner, Breitenaustrasse 128, Schaffhausen, Switzerland
Filed Dec. 18, 1967, Ser. No. 691,616
Claims priority, application Switzerland, Dec. 23, 1966, 18,490/66
Int. Cl. F16l 5/00
U.S. Cl. 248—56
10 Claims

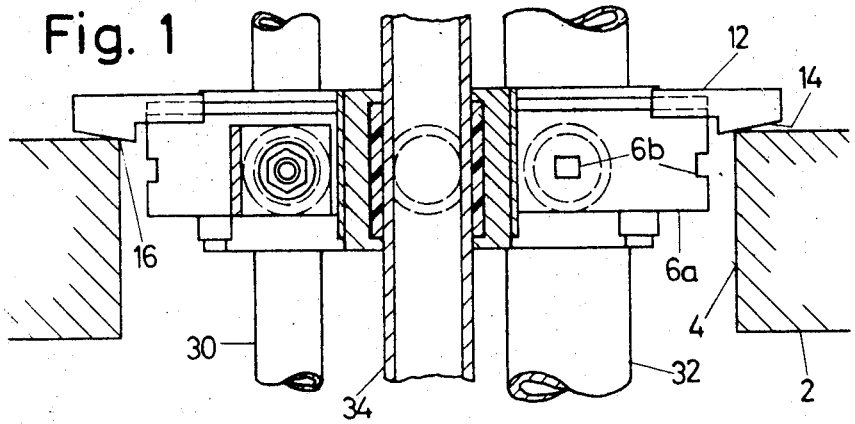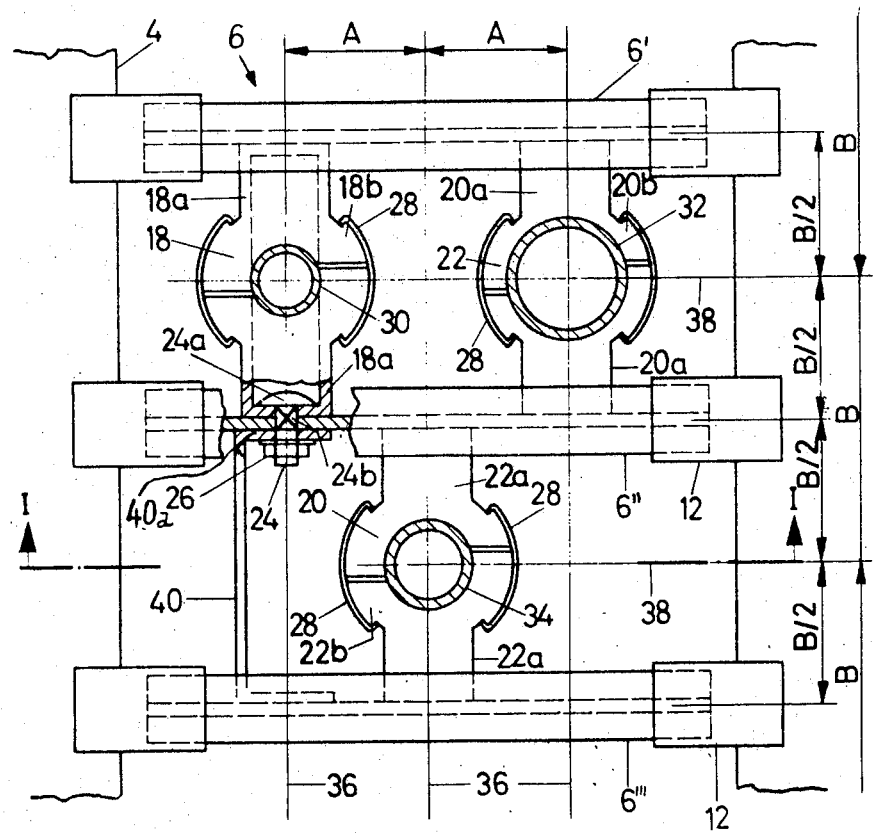

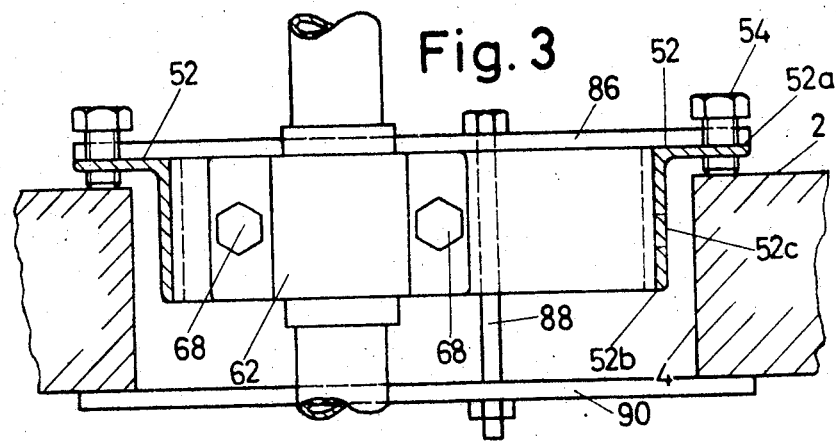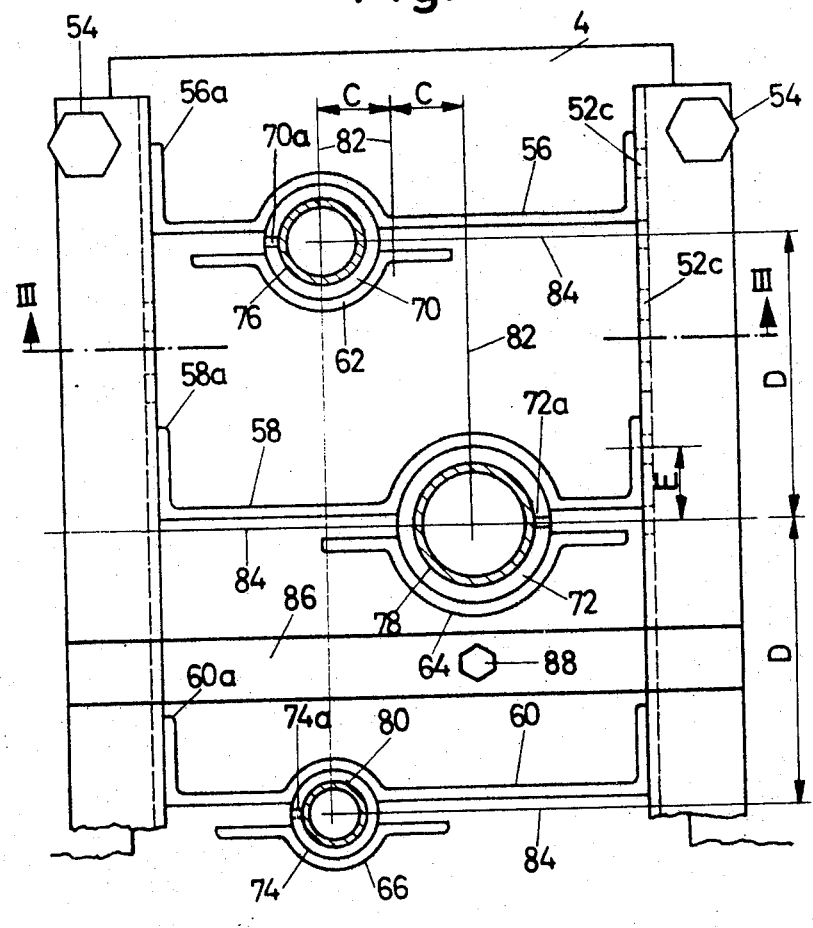

ABSTRACT OF THE DISCLOSURE

An installation device, especially for so-called rising or ascending conduits in order to mount such conduits at a predetermined spacing from one another in an opening provided at the brickwork or the like. This installation or mounting device incorporates a plurality of first type of structural elements extending substantially in parallelism with respect to one another and including means for supporting such first type of structural elements at the brickwork. Further, positioning means are provided for each of said first type structural elements and which are substantially uniformly distributed throughout the length of each associated first type of structural element. Additionally, a plurality of second type of structural elements is provided which defines conduit clamp means for engaging with an associated tubular conduit, and each of such conduit clamp means includes end portions engaging with two respective structural elements of the first type. The respective conduit axis defined by said conduit clamp means containing, independently of the diameter of the conduits to be mounted, predetermined points of intersection of an imaginary grid system consisting of grid lines extending substantially perpendicular to one another.

BACKGROUND OF THE INVENTION

The present invention relates to an improved installation or mounting device, especially for so-called rising or ascending conduits. The inventive installation device serves for mounting these conduits at a predetermined spacing from one another in an opening provided at the brickwork or the like.

Now, it should be recognized that a number of different devices have become known to the art which should simplify the installation of pipes or conduits in buildings. Among these prior art devices are those which serve for the installation of vertically running pipes or conduits. These conduits are generally arranged in so-called riser- or ascending-conduit shafts, wherein the installation devices are intended to support the ascending conduits throughout their entire length at a predetemined axis so that the branch conduits or lines which connect therewith at the individual floors or stories maintain a predetermined position and it is possible, for example, to prefabricate the branch conduits or lines at the workshop or factory. Since the pipes or conduits need only be mounted at the construction site and practically no adjustment work is necessary any longer, it is possible to obtain a considerable rationalization of the installation work and therefore, achieve a saving in costs.

According to a known installation device there is provided a box-like frame in which there are contained the plumbing or sanitary riser- and distribution conduits for an apartment or a floor of a building. Apart from the fact that this known construction can only then be utilized when the ascending conduits, that is to say, all of the conduits which run in vertical direction through the frame, are positively divided into sections which correspond to the height of a floor, this known device also has the drawback that the frame requires a relatively large amount of space since all of the ascending conduits are arranged in a row. A further drawback of this known prior art construction, of course, resides in the fact that the box or box-like frame, which is supported at the floor of the story, requires a covering at at least three sides since its dimensions do not permit imbeding such in the brickwork or masonry.

SUMMARY OF THE INVENTION

Accordingly, it is a primary object of the present invention to provide an improved installation device of the type considered which effectively overcomes the aforementioned drawbacks of the prior art structures.

Another, more specific object of the present invention relates to an improved installation device for the mounting of ascending conduits or the like in a highly efficient, simplified, economical and reliable manner.

Still a further important object of this invention relates to an improved installation device for mounting ascending conduits in the opening of the brickwork or the like of a building in an extremely quick, rational expedient, economical and secure manner, requiring a minimum of on the job adjustments and resulting in a space-saving mounting arrangement.

Now, in order to implement these and still further objects of the present invention which will become more readily apparent as the description proceeds, the inventive installation device, which is especially suited for the mounting of ascending tubular conduits, in order to mount such at a predetermined spacing from one another in an opening provided at the brickwork, comprises a plurality of first type of structural elements which extend substantially parallel to one another. The first type of structural elements include means for supporting such structural elements at the brickwork, and positioning means are also provided for each of these structural elements, with such positioning means being substantially uniformly distributed throughout the length of the associated structural elements. Additionally, a plurality of second type of structural elements are provided which define conduit clamp means of different diameter and including end portions engaging with the positioning means of two respective structural elements of the first type. The conduit axes defined by the conduit clamp means contain, independently of the diameter of the conduits to be mounted, predetermined points of intersection of an imaginary grid system consisting of grid lines extending substantially perpendicular to one another.

Owing to the arrangement of the conduits in a grid system, it is possible to exactly determine the position of the conduits and therefore the position of the connection locations for the distribution conduits. However, it is possible to provide the conduit axes at the grid system in such a manner that the rising or ascending conduits extend completely in the riser conduit shaft, in other words are arranged therein in space-saving fashion.

BRIEF DESCRIPTION OF THE DRAWINGS

The invention will be better understood, and objects other than those set forth above, will become apparent, when consideration is given to the following detailed description thereof. Such description makes reference to the annexed drawings wherein:

FIG. 1 is a sectional view of a first embodiment of inventive installation device of the type considered, taken along the line I—I of FIG. 2;

FIG. 2 is a plan view of the installation device depicted in FIG. 1;

FIG. 3 is a sectional view of a second embodiment of inventive installation device, taken along the line III—III of FIG. 4; and FIG. 4 is a plan view of a portion of the installation device illustrated in FIG. 3.

DESCRIPTION OF THE PREFERRED EMBODIMENTS

Describing now the drawings, it will be seen that in FIG. 1 reference numeral 2 designates the floor of a story of a building, whereby this floor is provided with an opening 4 of for instance rectangular or square configuration for the pipe conduits which are to be installed and which run vertically in the building. By referring to FIG. 2, it will be recognized that the installation device incorporates profile rails 6 and, in such figure there are shown three such profile rails 6′, 6″, and 6‴ which extend transverse to the opening 4. Each of these profile rails 6′, 6″, and 6‴ are supported at both ends at the floor 2 of a story by means of the base pieces 12. These base pieces 12, which are displaceably mounted at the ends of the associated rails 6′, 6″, and 6‴, possess support or bearing surfaces 14 which are directed inwardly and downwardly at an inclination with respect to the longitudinal axis of each associated base piece 12. These support or bearing surfaces 14 cooperate with the upper edges 16 formed by the opening 4 at the floor 2.

Continuing, it will be recognized that pipe or conduit clamp means 18, 20 and 22 are arranged between two respective neighboring rails members 6. Each of these conduit clamp means 18, 20, and 22 is advantageously composed of two halves or portions, wherein each half or portion possesses a hollow connecting pin or lug portion 18a, 20a, and 22a respectively. Further, it should be understood, that the frontal end of each connecting or attachment pin 18a, 20a, 22a, is pierced by screw means 24 or the like, the head 24a of which is located internally of the associated connecting pin or lug, and the square-shaped shaft 24b of which is in engagement with a correspondingly square-shaped recess 6b (FIG. 1) provided at the webs 6a of the associated profile rail 6. Furthermore, each such screw member 24 is secured by an appropriate nut member 26. For the sake of simplicity in illustration, in FIG. 2 only a single one of these screw members 24 has been depicted.

The two halves of each conduit clamp means 18, 20 and 22 are held together by two respective clamping elements 28 or the like, which engage behind appropriate shoulders or projections 18b, 20b, 22b of the aforementioned conduit clamp means. In so doing, these clamping elements 28 can be constructed as spring clamps, yet, however, if they possess a relatively rigid construction they can be pushed onto the projections 18b, 20b, 22b, for instance from the top, in other words, perpendicular to the plane of the drawing of FIG. 2, and wherein the shoulders 18b, 20b, 22b and/or the clamping elements 28 extend conically so that upon displacing the latter onto the associated shoulders there is undertaken a wedge action.

As will be readily apparent by inspecting FIG. 2, the conduit clamping means 18 encloses a pipe or conduit 30 of relatively small diameter and the conduit clamp means 20 a pipe 34 of relatively larger diameter, whereas the pipe 32 which is retained by the conduit or pipe clamp means 22 possesses the largest diameter of all three conduits or pipes. Additionally, it will be recognized that the axes of these conduits 30, 32 and 34, the position of which is defined by the arrangement of the conduit clamp means 18, 20, 22 between the profile rails 6′ and 6″ and 6″ and 6‴, all extend through points of intersection of grid lines 36 and 38 which extend perpendicular to one another. As a result, the spacing of two neighboring conduit axes from one another is at least equal to the spacing between two nighboring, parallelly extending grid lines. In the embodiment of inventive installation device depicted in FIG. 2, the spacing between the axis of the conduit 30 and that of the conduit 32 amounts to twice the spacing A between the grid lines 36. On the other hand, the spacing of the axis of the conduit 34 from the grid line 38 intersecting the axes of the conduits 30 and 32, is equal to the spacing B between two neighboring grid lines 38.

Whereas the grid spacing A is determined by the spacing of the recesses or openings 6b in the rails 6, the grid spacing B is determined by the extension of the conduit clamp means 18, 20, 22 between the profile rails 6, which is independent of the diameter of the conduits to be mounted or secured, and further is dependent on the thickness of the web 6a of these profile rails. Furthermore, the construction of the conduit clamp means 18, 20, and 22 is chosen in such a manner that the conduit axes always are situated centrally between the profile rails 6, so that the spacing between the grid lines 38 and the longitudinal axis of the profile rails 6 always amounts to one-half of the grid spacing in the corresponding direction, that is to say B/2.

From the foregoing discussion it should be appreciated that when utilizing the described inventive installation device, the conduits or pipes assume a predetermined relative position with respect to one another. This relative position can be maintained in all of the stories of the building by corresponding assembly of the installation device. It is therefore possible to mount the prefabricated branch conduits or lines without any further adjustment work.

Furthermore, by displacing the base pieces 12 at the associated profile rails 6, it is possible to adjust these rails into an exactly horizontal position. In so doing, the point of contact of the edges 16 with the inclined support surfaces 14 is displaced.

In order to impart a sufficient stability to the installation device of the invention in the direction of the grid lines 36, in other words, to retain the rails 6 in parallelism with regard to one another, a bracket member 40 is arranged between the rails 6″ and 6‴. One end or leg 40a of this bracket member 40 is fixedly clamped beneath the nut member 26 of the associated threaded screw member 24. Its other end is connected with the rail member 6‴ by means of a suitable leg or rail and nut member (not shown), whereby also in this case there is preferably employed a screw which simultaneously fixedly retains a conduit clamp means arranged at the opposite side of such rail member.

Between the rails or rail members 6′ and 6″ it is not necessary to provide a bracket member 40, since in this instance the parallelism of these rails is insured by the spaced arrangement of both conduit clamp means 18 and 22.

Now, in FIGS. 3 and 4 there is illustrated a variant embodiment of inventive installation device which differs from that shown in FIGS. 1 and 2 primarily through the fact that the rail-shaped elements extend, in this case, parallel to the longitudinal sides of the opening 4 at the floor 2, whereas the conduit clamp means extend parallel to the smaller sides of this opening 4. The profile rails or rail members 52 possess a substantially L-shaped profile or cross-section and it will be recognized that the horizontally extending leg portion 52a of each such rail 52 partially covers the edge of the associated opening 4. Additionally, it will be understood that hexagonal screws 54 for instance, are threaded into the legs 52a, to enable the installation device to be placed in the proper horizontal position. The vertical legs 52b of the rails 52 extend into the opening 4 and are provided with holes or apertures 52c which are uniformly distributed throughout their length. Furthermore, conduit clamp means, 56, 58, 60 are arranged between the vertical legs 52b of the rails 52. These conduit clamp means 56, 58 and 60 have in common with the embodiment of conduit clamp means depicted in FIGS. 1 and 2 that, their largest dimension, that is to say their extension between the rails 52 is the same, notwithstanding the fact that these clamp means are constructed to accommodate conduits of different diameters.

Also, it will be seen that the clamp means 56, 58 and 60 are provided at their respective ends with attachment leg members 56a, 58a, and 60a, respectively, which are pierced by non-illustrated rails which engage in the holes or apertures 52c of the rails 52. A clamping element 62, 64, 66 is associated with each of the clamps 56, 58, 60, respectively, and each such clamp element 62, 64, 66 is connected by means of clamping screws 68 with the associated clamp 56, 58, 60 respectively. These clamp elements 62, 64, 66, together with the conduit clamps, 56, 58 and 60 respectively, enclose a respective collar or packing ring 70, 72 and 74 which, in turn, surrounds the associated pipe conduit 76, 78 and 80, respectively, which is to be installed. These collars or packing rings 70, 72 and 74, which are accommodated in their diameter to the conduit and the associated clamps, are each equipped with an axially extending longitudinal slot 70a, 72a, 74a respectively, allowing for a certain threading of the collars 70, 72, 74 and, therefore, fixedly clamping the associated conduit by tightening the screws 68 or the like.

As will be recognized by inspecting FIG. 4, the axes of the conduit 76, 78 and 80, once again contain the points of intersection of the grid lines of a grid system. The grid lines 82 which extend parallel to the longitudinal side of the opening 4, and which are arranged at the grid spacing C, intersect at right angles with the grid lines 84, having a grid spacing D. The grid spacing D is a multiple, that is to say four times the spacing E between neighboring holes 52c.

The grid spacing C selected in the drawing for this embodiment, enables arranging a pipe or conduit in the middle between both rails 52 and having a diameter which is still larger than that of the conduit 78. In so doing, the conduit axis extends through the point of intersection between a grid line 84 and the central grid line of the three depicted or illustrated grid lines 82.

In any case it is apparent that it is desired to have as large as possible displacement of the conduit within the limits defined by the width of the opening 4, in order to simplify the mounting of the branch lines.

In certain instances it can be advantageous to span or brace the installation device at the floor 2 of the story of the building, in that for instance a number of tensioning clamps or brackets 86 are connected with clamping brackets 90, by means of suitable tensioning fastening devices, such as tensioning bolts 88, which extend parallel to the conduits. The clamping brackets 90, as shown, extend at the underside of the floor 2 across the opening 4, whereas the tensioning brackets 86 are on the upper side of the floor 2 and also across the opening 4. Furthermore, it should be understood that the installation device depicted in FIGS. 1 and 2 can be braced in a similar manner against the floor of the story of the building.

In contrast to the manner of supporting the inventive installation device depicted in FIGS. 1 and 2, it would be naturally possible at the story floor to dispense with the base pieces 12 and to support the rails 6 at supports which could be provided at a respective carrier or support extending at each side of the rail ends. The supports, which could possess a similar construction as the rail members 52 depicted in FIGS. 3 and 4, enable an adjustment of the installation device likewise by means of leveling screws similar to the leveling screws 54.

The inventive embodiments of installation devices enable the preparation of the rising or ascending conduits in a shop or factory, and the separate transportation of the supports and the pipe conduits to the construction site. In this manner, mounting at the place of construction is possible quickly and exactly. The transport of the disassembled ascending conduits requires considerably less storage space than the already assembled mounting blocks of the prior art constructions, which have been prepared in the shop or factory. Finally, it is mentioned that the conduit clamp means are formed as shaped structural elements, for instance formed by casting or molding.

While there is shown and described present preferred embodiments of the invention, it is to be distinctly understood that the invention is not limited thereto, but may be otherwise variously embodied and practised within the scope of the following claims. Accordingly, what is claimed is:

1. An installation device, especially for ascending tubular conduits, for mounting the conduits at a predetermined spacing from one another in an opening provided in brickwork comprising, in combination: a plurality of first type of structural elements extending substantially in parallelism with respect to one another, said first type of structrural elements including means for supporting said plurality of first type of structural elements at the brickwork, positioning means provided for each of said first type of structural elements, said positioning means being substantially uniformly distributed throughout the length of each associated first type of structural element, a plurality of second type of structural elements defining conduit clamp means for engaging with the associated tubular conduit, each of said conduit clamp means including end portions, said end portions being, respectively, provided with oppositely extending means that coact with said positioning means of two respective structural elements of said first type, so as to preclude movement of said conduit clamp means lengthwise of said structural elements, the conduit axes defined by said conduit clamp means containing, independently of the diameter of the conduits to be mounted, predetermined points of intersection of an imaginary grid system consisting of grid lines extending perpendicular to one another.

2. An installation device as defined in claim 1, wherein said plurality of first type of structural elements is defined by individual profile rail means, said positioning means being provided at each of said profile rail means and being defined by aperture means.

3. An installation device as defined in claim 2, wherein said profile rail means comprises at least two profile rail members each possessing a substantially angle-shaped profile.

4. An installation device, especially for ascending tubular conduits, for mounting the conduits at a predetermined spacing from one another in an opening provided in brickwork comprising, in combination: a plurality of first type of structural elements extending substantially in parallelism with respect to one another, said first type of structural elements including means for supporting said plurality of first type of structural elements at the brickwork, positioning means provided for each of said first type of structural elements, said positioning means being substantially uniformly distributed throughout the length of each associated first type of structural element, a plurality of second type of structural elements defining conduit clamp means for engaging with the associated tubular conduit, each of said conduit clamp means including end portions engaging with said positioning means of two respective structural elements of said first type, the conduit axes defined by said conduit clamp means containing, independently of the diameter of the conduits to be mounted, predetermined points of intersection of an imaginary grid system consisting of grid lines extending perpendicular to one another, said plurality of first type structural elements being defined by individual profile rail means, said positioning means being provided at each end of said profile rail means and being defined by aperture means, each of said conduit clamp means incorporating molded parts which have two diametrically opposed and projecting pin portions.

5. An installation device as defined in claim 4, wherein each of said conduit clamp means comprises two conduit clamping halves, and clamping element means for holding together each of said two conduit clamping halves.

6. An installation device as defined in claim 4, wherein said means for supporting said plurality of profile rails at the brickwork comprises base elements which are displaceably mounted at each associated profile rail means, each of said base elements being provided with inclined extending bearing surface means.

7. An installation device as defined in claim 4, wherein said means for supporting said profile rails at the brickwork includes support means extending substantially transverse to said profile rail means.

8. An installation device, especially for ascending tubular conduits, for mounting the conduits at a predetermined spacing from one another in an opening provided in brickwork comprising, in combination: a plurality of first type of structural elements extending substantially in parallelism with respect to one another, said first type of structural elements including means for supporting said plurality of first type of structural elements at the brickwork, positioning means provided for each of said first type of structural elements, said positioning means being substantially uniformly distributed throughout the length of each associated first type of structural element, a plurality of second type of structural elements defining conduit clamp means for engaging with the associated tubular conduit, each of said conduit clamp means including end portions engaging with said positioning means of two respective structural elements of said first type, the conduit axes defined by said conduit clamp means containing, independently of the diameter of the conduits to be mounted, predetermined points of intersection of an imaginary grid system consisting of grid lines extending perpendicular to one another, said plurality of first type structural elements being defined by individual profile rail means, said positioning means being provided at each end of said profile rail means and being defined by aperture means, said profile rail means comprising at least two profile rail members each possessing an angle-shaped profile, said means for supporting said profile rails at the brickwork comprising leveling screw means.

9. An installation device, especially for ascending tubular conduits, for mounting the conduits at a predetermined spacing from one another in an opening provided in brickwork comprising, in combination: a plurality of first type of structural elements extending substantially in parallelism with respect to one another, said first type of structural elements including means for supporting said plurality of first type of structural elements at the brickwork, positioning means provided for each of said first type of structural elements, said positioning means being substantially uniformly distributed throughout the length of each associated first type of structural element, a plurality of second type of structural elements defining conduit clamp means for engaging with the associated tubular conduit, each of said conduit clamp means including end portions engaging with said positioning means of two respective structural elements of said first type, the conduit axes defined by said conduit clamp means containing, independently of the diameter of the conduits to be mounted, predetermined points of intersection of an imaginary grid system consisting of grid lines extending perpendicular to one another, said plurality of first type structural elements being defined by individual profile rail means, said positioning means being provided at each end of said profile rail means and being defined by aperture means, tensioning bracket means capable of being supported at the underside of the brickwork opening, and at least one tensioning fastening element for connecting said tensioning bracket means with said profile rail means bearing at the upper side of said brickwork opening.

10. An installation device as defined in claim 9, wherein said tensioning fastening element is a threaded bolt.

References Cited

UNITED STATES PATENTS

| | | | |
|---|---|---|---|
| 1,133,976 | 3/1915 | Kraus | 248—68 |
| 2,404,531 | 7/1946 | Robertson | 248—68 |
| 2,535,427 | 12/1950 | Kindorf | 248—68 |
| 3,186,051 | 6/1965 | Waddell | 248—68 X |
| 3,216,683 | 11/1965 | Girard | 248—68 |

CHANCELLOR E. HARRIS, Primary Examiner

U.S. Cl. X.R.

248—68